(No Model.)
J. & J. R. BOWERS.
CLUTCH MECHANISM.
No. 392,714. Patented Nov. 13, 1888.
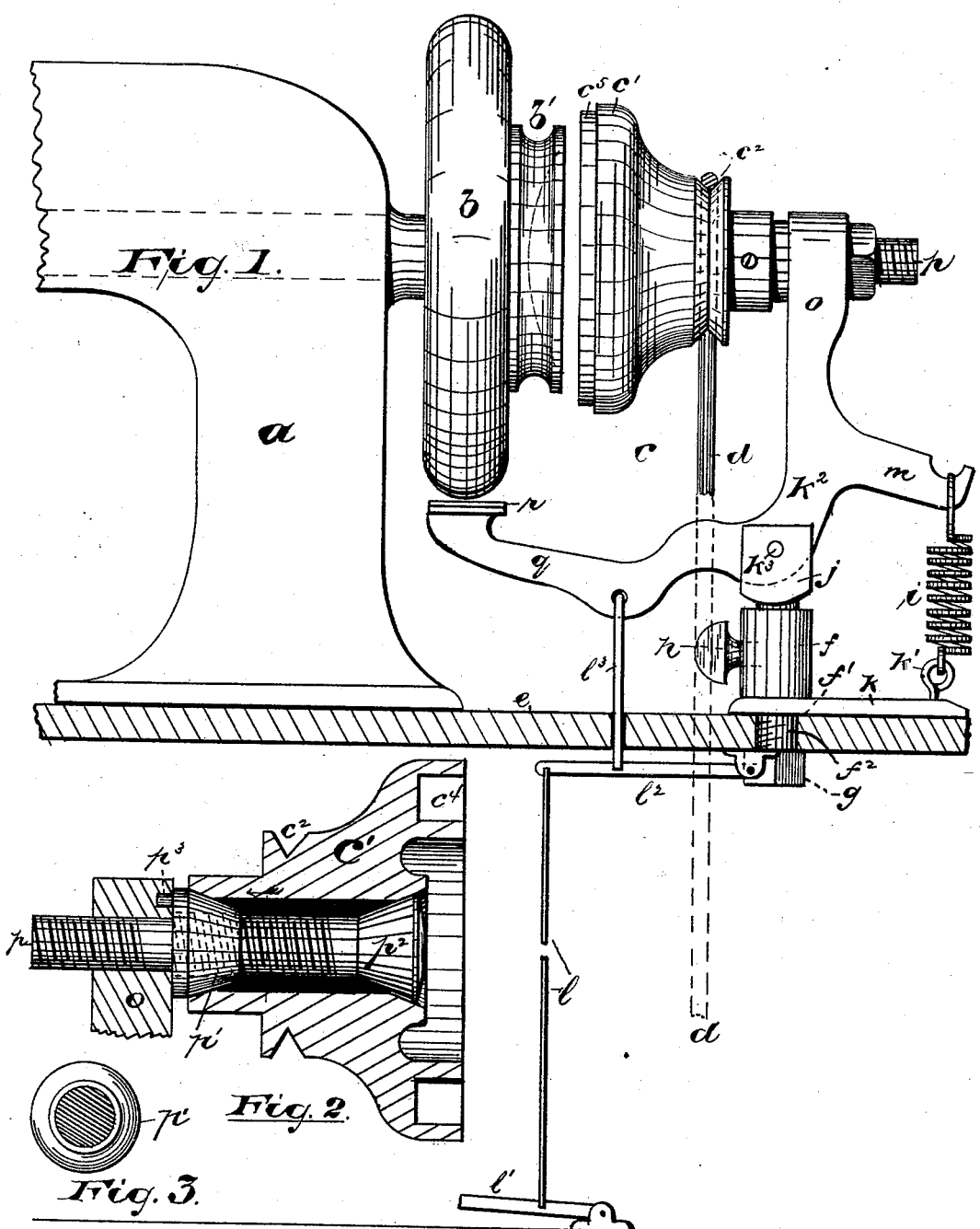
WITNESSES:
Oscar A. Michel
Philip G. Voegtlen
INVENTOR:
James Bowers,
John R. Bowers,
BY Drake & Co ATT'YS.
N. PETERS, Photo-Lithographer, Washington, D. C.

UNITED STATES PATENT OFFICE.

JAMES BOWERS AND JOHN R. BOWERS, OF NEWARK, NEW JERSEY.

CLUTCH MECHANISM.

SPECIFICATION forming part of Letters Patent No. 392,714, dated November 13, 1888.

Application filed January 4, 1888. Serial No. 259,782. (No model.)

*To all whom it may concern:*

Be it known that we, JAMES BOWERS and JOHN R. BOWERS, citizens of the United States, residing at Newark, in the county of Essex and State of New Jersey, have invented certain new and useful Improvements in Clutch and Brake Mechanisms; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a friction device for sewing-machines that will enable the head or upper part of said sewing-machine to be removed from its bed-plate, board, or table without disconnecting the said friction device from its bearings or making it necessary to disconnect the belt by which power is transmitted to the said friction device.

A further object is to reduce the cost of construction and to provide a device that will be more efficient in the results sought to be accomplished.

The invention consists in the improved friction device and in the arrangements and combinations of parts, substantially as will be hereinafter set forth, and finally embodied in the clauses of the claims.

Referring to the accompanying drawings, in which like letters of reference indicate corresponding parts in each of the several figures of the drawings, Figure 1 is a side elevation of the improved mechanism. Fig. 2 is a detail view of a certain shaft or bolt having a surrounding oil-chamber forming a part thereof, and Fig. 3 is a sectional view.

In said drawings, $a$ indicates the arm or head of the sewing-machine, having an ordinary fly-wheel or friction-wheel, $b$, mounted on a shaft which extends through said arm or head in any suitable manner, $b'$ indicating the ordinary pulley commonly found in connection with said wheel, the said fly-wheel or friction wheel being preferably in operative relation to the mechanism for driving the needle-bar. $c$ is a friction device adapted to receive power from suitable shafting or pulleys through belting $d$, and to transmit the power to the sewing-machine, the said friction device or motor being arranged upon the table or plate $e$ at a position adjacent to the friction-wheel $b$ of said sewing-machine and separate from the head of the machine, so that the head or upper portion of the machine may be removed from the table $e$, for the purpose of repairs or otherwise, without removing the belt by which the power is communicated to the said head of the machine.

The preferred construction of my invention is shown in the drawings, in which $f$ is a stud or post adapted to be secured upon the top of the table, said stud or post having a suitable shoulder, $f'$, to engage the surface of said table and a shank or bolt, $f^2$, adapted to pass through the said table and be secured therein by means of a suitable nut, $g$. The said stud also has, or may have, a lateral extension, $k$, adapted to provide means $k'$ for receiving and holding the lower end of a spring, $i$. The said post also is provided with a receptacle for an adjustable lever-support, $j$, which may be raised or lowered on or in said post, so as to bring the friction-wheel $c'$ into proper relation to the wheel $b$. The lever-support may be secured within the post by means of a set-screw, $h$, or other suitable form of a clamp or holder. Upon said lever-support, held preferably by a pivot, $k^3$, is a lever, $k^2$, which communicates with a treadle, $l'$, or system of levers beneath the table by means of a rod or suitable connection, $l$. Said lever $k^2$ provides means, such as an arm, $m$, to receive the opposite end of the spring $i$, above referred to, whereby the friction-wheel $c'$, at the upper end of said lever $k^2$, is automatically withdrawn from frictional contact with the co-operating friction-wheel $b$ of the sewing-machine head. Said lever $k^2$ is also provided with a bearing-arm, $o$, adapted to receive the friction-wheel shaft $p$ and a braking-arm, $q$, adapted to engage the periphery or other portion of the friction-wheel $b$ of the sewing-machine to stop the movement thereof when the wheel $c'$ is withdrawn therefrom, as above described. Said braking-arm $q$ is provided with leather or other suitable frictional substance, $r$, adapted to engage the said wheel $b$ of the head without injuring the same. When in engagement with the said wheel $b$ of the head, the braking-arm immediately arrests its motion by frictional contact and does so automatically.

The braking-arm $q$ and the bearing-arm $o$ for the frictional wheel are preferably of one piece to work together. When the foot is removed from the treadle $l$, the spring $i$ acts to draw the motor-wheel $c'$ from the machine-wheel $b$, and at the same time the brake $q$ engages said wheel $b$ and stops the movement of the same. The friction-wheel $c'$ is journaled on the shaft $p$, and the latter is provided preferably with an oil-chamber, as shown in Fig. 2. Said wheel $c'$ is also grooved, as at $c^2$, to receive a belt, whereby power is communicated from any suitable pulley or wheel disposed near the floor or otherwise.

The friction-wheel $c'$ is adapted to engage the wheel $b$ of the machine and transfer power to the wheel $b$ in any manner. The said wheel $c'$ engages conical bearings $p'$ $p^2$ on the post, as shown in Fig. 2, so that wear can be taken up, one of said conical bearings being immovable by being pinned, as at $p^3$, to the arm of the lever $k^2$.

Having thus described the invention, what we claim as new is—

1. The combination, with the head of a sewing-machine, of a friction-wheel which engages the side of the wheel $b$ of said head and transmits power thereto, a pivoted lever supporting said friction-wheel, and a treadle and connections for forcing said friction-wheel against said wheel $b$, substantially as and for the purposes set forth.

2. The combination, with the machine-head having a wheel, $b$, for driving the needle-bar, of a lever, $k^2$, connected with a treadle, a friction-wheel carried by said lever $k^2$ and having a belt-groove, $c^2$, to receive the driving-belt $d$, and a spring for drawing the friction-wheel from said wheel $b$, substantially as and for the purposes set forth.

3. In combination with a lever, $k^2$, having a brake-arm, $q$, and an arm, $o$, for supporting the shaft or bolt of the friction-wheel, a spring, $i$, friction-wheel $c'$, belt $d$, treadle $l'$, and bolt $p$, said parts being arranged substantially as and for the purposes set forth.

4. In combination with a post or stud, $f$, and an adjustable lever-support, a lever having arms $o$ and $m$, a spring, and a friction-wheel journaled on said arm $o$ and adapted to be moved to and from the co-operating wheel $b$ of the machine-head, substantially as and for the purposes set forth.

5. In combination with the head $a$ of a sewing-machine having a wheel, $b$, a stud, $f$, an adjustable lever-bearing arranged on said stud, a lever carried by said bearing and provided with a brake, and a friction-wheel, a spring, a treadle, and a lever, $l^2$, and suitable connections, all said parts being arranged substantially as and for the purposes set forth.

6. In combination with the lever $k^2$, adapted to be arranged on the table of a sewing-machine, and a friction-wheel, $c'$, adapted to be brought into engagement with the wheel $b$ of said sewing-machine, a bolt, $p$, having conical bearings $p'$ $p^2$, and adapted to form with said friction-wheel an oil-chamber, said parts being arranged substantially as and for the purposes set forth.

7. In combination with the head of a sewing-machine having the wheel $b$, a stud, $f$, and a lever fulcrumed on said stud and having a brake-arm, $q$, a friction-wheel arm, $o$, and spring-arm $m$, a spring, $i$, friction-wheel, and suitable means for operating said lever, substantially as set forth.

8. In combination with a stud, $f$, adapted to be secured on a table, $e$, of a sewing-machine, and having thereon means $k'$ to receive the spring, a lever having an arm, $m$, adapted to receive the opposite end of the spring, and provided with a brake and carrying a friction-wheel, a spring, and suitable means for operating said lever, substantially as and for the purposes set forth and shown.

In testimony that we claim the foregoing we have hereunto set our hands this 21st day of December, 1887.

JAMES BOWERS.
JOHN R. BOWERS.

Witnesses:
CHARLES H. PELL,
OSCAR A. MICHEL.